(12) United States Patent
Hohner et al.

(10) Patent No.: US 6,205,774 B1
(45) Date of Patent: Mar. 27, 2001

(54) METHOD FOR DETECTING FLOW-REDUCING CHANGES IN AN EXHAUST-GAS CATALYST BODY

(75) Inventors: Peter Hohner, Leinfelden-Echterdingen; Jörg Miroll, Köngen; Hartung Wilstermann, Bammental, all of (DE)

(73) Assignee: DaimlerChrysler AG, Stuggart-Mohringen (DE)

( * ) Notice: Subject to any disclaimer, the term of this patent is extended or adjusted under 35 U.S.C. 154(b) by 0 days.

(21) Appl. No.: 09/479,147

(22) Filed: Jan. 7, 2000

(30) Foreign Application Priority Data

Jan. 14, 1999 (DE) .............................. 199 01 066

(51) Int. Cl.$^7$ .................................................. F01N 3/00
(52) U.S. Cl. .................... 60/277; 60/274; 123/406.26; 123/435; 73/118.1; 73/35.08
(58) Field of Search .................. 60/274, 277, 291; 123/406.27, 406.26, 435; 73/23.31, 35.08, 118.1

(56) References Cited

U.S. PATENT DOCUMENTS

| | | | |
|---|---|---|---|
| Re. 32,301 | * 12/1986 | Latsch et al. | ............... 60/276 |
| 4,487,184 | * 12/1984 | Boning et al. | ............... 123/425 |
| 5,074,270 | * 12/1991 | Denz et al. | ............... 60/277 |
| 5,207,200 | * 5/1993 | Iwata | ............... 123/425 |
| 5,261,271 | 11/1993 | Bihn et al. | . |
| 5,563,332 | * 10/1996 | Yasuda | ............... 73/35.08 |
| 5,778,855 | * 7/1998 | Czekala et al. | ............... 123/416 |
| 5,945,828 | * 8/1999 | Katogi et al. | ............... 123/406.27 |
| 5,983,862 | * 11/1999 | Nishiyama et al. | ............... 123/406.26 |
| 6,091,244 | * 7/2000 | Rottler | ............... 73/35.08 |

FOREIGN PATENT DOCUMENTS

| | | |
|---|---|---|
| 3828518 | * 3/1990 | (DE) . |
| 19614288 | 4/1996 | (DE) . |
| 525566A1 | 2/1993 | (EP) . |
| WO 94/16205 | 7/1994 | (WO) . |

* cited by examiner

*Primary Examiner*—Thomas Denion
*Assistant Examiner*—Diem Tran
(74) *Attorney, Agent, or Firm*—Marc Lorelli

(57) ABSTRACT

A method for detecting flow-reducing changes in an exhaust-gas catalyst body is provided. The method includes measuring the ion-current signal from an ion-current probe in an internal combustion engine and monitoring the signal to determine whether its signal strength for a particular operating cycle falls below a minimum strength which can be specified as a function of the engine operating state. The method also include providing warning information to the control system when such an event occurs. The method further includes a variety of embodiments used to determine whether the ion current signal falls below a minimum strength.

13 Claims, 3 Drawing Sheets

METHOD FOR DETECTING FLOW-REDUCING CHANGES IN AN EXHAUST-GAS CATALYST BODY

CROSS REFERENCE TO RELATED APPLICATION

Priority is claimed with respect to german application no. 199 01 066.8-13 filed in Germany on Jan. 14, 1999, the disclosure of which is incorporated herein by reference:

BACKGROUND OF THE INVENTION

1. Technical Field

The invention relates to a method for detecting flow-reducing changes in an exhaust-gas catalyst body of an exhaust-gas purification system during the operation of an associated internal combustion engine with at least one engine cylinder, the exhaust gas from which impinges upon the exhaust-gas catalyst body and to which an ion-current measuring probe is assigned.

2. Discussion

Generally, if exhaust-gas catalytic converters become too hot, they can lose not only their property of chemical conversion but can also suffer mechanical damage or even destruction. Fragments formed during this process can pass via the exhaust valves into an upstream engine cylinder and lead to engine damage. There is therefore a requirement to be able to detect those types of mechanical damage to the catalyst body which typically result in disintegration of its mechanical honeycomb structure and, associated with this, a reduction in the cross section of passage available for the exhaust gas flowing through.

One method that may be considered for detecting such mechanical changes in the exhaust-gas catalyst body which reduce the cross section of passage is to determine the exhaust-gas backpressure, which increases upstream of the catalyst body due to the said reduction in the cross section of passage of the latter. Due to the high temperatures prevailing, however, this procedure requires a relatively high outlay. Another possibility of detecting the mechanical state of the catalyst body is temperature measurement, but this necessitates a corresponding temperature sensor.

It is known practice to use an ion-current measuring probe in an engine cylinder, i.e. in its combustion chamber, to carry out ion-current measurement during a respective operating cycle of the engine cylinder, it being possible for a spark plug to act as the ion-current measuring probe. The ion-current signal supplied by the ion-current measuring probe is customarily used particularly for knock detection, see Patent Specification DE 196 14 288 C1, which also mentions that ion-current measurement can also be used to detect spark failures, which can cause damage to a connected exhaust-gas catalytic converter. This and further applications of ion-current measurement, such as ignition-point feedback, transient lambda-value control, injection control and exhaust-gas recirculation control, are mentioned in a magazine article with the title "Ion-gap sensing for engine control" in Automotive Engineering, September 1995, page 65.

The technical problem underlying the invention is to provide a method of the type stated at the outset by means of which flow-reducing changes in an exhaust-gas catalyst body, particularly those due to destruction of its mechanical structure by excessive temperatures, can be detected reliably with a relatively low outlay.

SUMMARY OF THE INVENTION

The method of the present invention is based on the realization that a flow-reducing change in the catalyst body leads to an increased exhaust-gas backpressure upstream of the catalyst body and, as a result, to an increased residual-gas rate in those engine cylinders which are connected on the exhaust side to this exhaust-gas catalyst body. With the ion-current measuring probe active, an increased residual-gas rate in the engine cylinder leads to lower ionization and hence to a lower ion-current signal from the latter, given otherwise identical conditions, in particular given the same engine operating point.

According to the invention, the ion-current signal of the ion-current measuring probe is then monitored to determine whether its signal strength for a particular operating cycle of the associated cylinder continuously falls below a minimum strength which can be specified as a function of the engine operating state.

It is self-evident that the minimum strength value concerned is chosen so that it is exceeded by the ion-current signal when the engine is operating correctly and the catalyst body is undamaged. If undershooting of the minimum strength value is detected, therefore, this is an indication that a flow-reducing change in the catalyst body may have taken place, in particular degradation of its mechanical honeycomb structure by overheating. In this case, warning information to this effect is generated.

It is self-evident that this warning information represents a condition which is necessary but not always sufficient to prove that there is a flow-reducing change in the catalyst body. This means that, in systems in which the reduction concerned in the ion-current signal strength cannot have any other cause, it is possible to infer the presence of a flow-reducing change in the catalyst body directly from the generation of the warning information. If, on the other hand, other causes for such a reduction in the ion-current signal strength are possible, it may be necessary to carry out a supplementary check to determine whether the generation of the warning information has actually been caused by a flow-reducing change in the catalyst body or whether there is some other reason for it. For safety's sake, provision can be made for the warning information to trigger engine cut-off or at least an interruption to injection to the engine cylinders concerned. In either case, it is possible to infer that the exhaust-gas catalyst body is intact as long as no warning information is generated.

The signal strength of the ion-current signal in a particular engine-cylinder operating cycle, which signal strength is used for evaluation, can be implemented in various ways. One embodiment of the present invention implements a specific provision a peak-value amplitude or the time integral of the ion-current signal for the particular operating cycle as the signal strength to be evaluated and to specify suitable minimum values dependent on the engine operating state for this purpose. To avoid incorrect generation of warning information due to "maverick events" or cycle fluctuations of the ion-current signal, which result in fluctuations of the ion-current amplitude even in the case of a constant engine operating point, the signal strength determined from the ion-current signal measured is smoothed or averaged over a number of operating cycles.

In an alternate embodiment of the present invention, the method includes a step where the minimum strength is specified on the basis of a reference-strength characteristic map as a function of the speed and load of the internal combustion engine, thereby allowing for the fact that the ion-current signal amplitude changes as a function of the engine speed and engine load. Specifying such a characteristic map makes it possible to evaluate the ion-current signal for any flow-reducing changes in the catalyst body at every engine operating point in the characteristic map.

As an additional alternative embodiment of the invention, the minimum strength is specified only for a selected desired engine operating state for evaluation, it being possible for this desired state to represent one or more engine operating points or part of the overall range of the engine operating point. The evaluation of the ion-current signal strength as regards detection of flow-reducing changes in the catalyst body is then limited to actual engine operating states which correspond to this desired engine operating state for evaluation. This eliminates the need to specify a characteristic map for the entire engine operating range.

A further aspect of the present is that the method developed is suitable specifically for systems with a plurality of parallel exhaust-gas catalyst converters. In this case, flow-reducing deterioration in one catalytic converter can be detected by comparing the ion-current signal strength for the cylinders connected to this catalytic converter with the ion-current signal strength of the remaining cylinders as a minimum-strength reference value. This allows reliable detection of a mechanical defect in a catalytic converter without specifying fixed minimum values for the ion-current strength since the occurrence of comparable mechanical damage simultaneously in two or more parallel catalytic converters is very improbable.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

Advantageous embodiments of the invention are illustrated in the drawings and are described below. In the drawings.

DETAILED DESCRIPTION OF THE DRAWINGS

A method for detecting flow-reducing changes in an exhaust-gas catalyst body is provided. In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Figure 1:
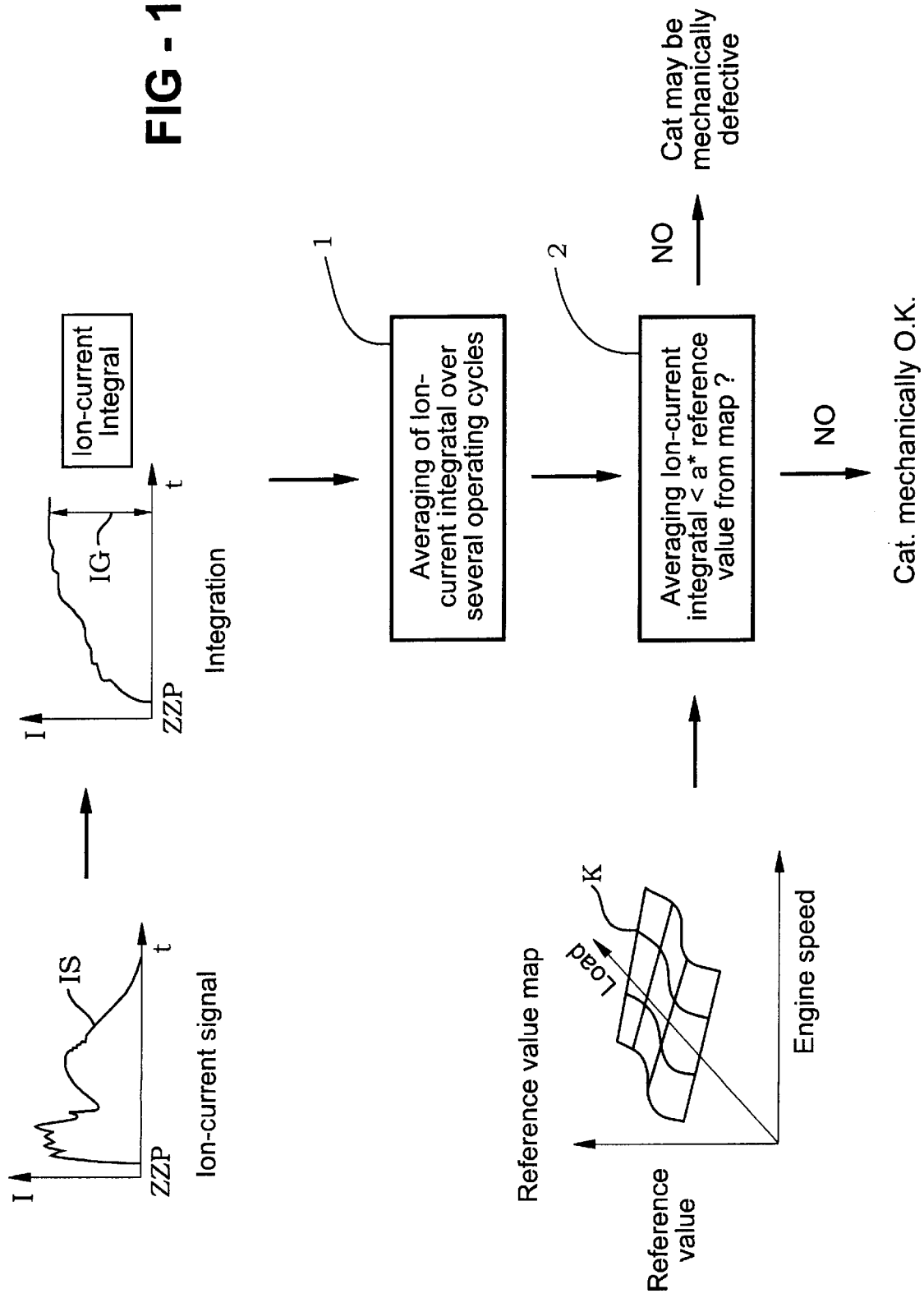
FIG. 1 shows a schematic flowchart of a first example of the method for detecting flow-reducing changes in an exhaust-gas catalytic converter for an internal combustion engine, with evaluation over the entire engine operating range.
Figure 3:
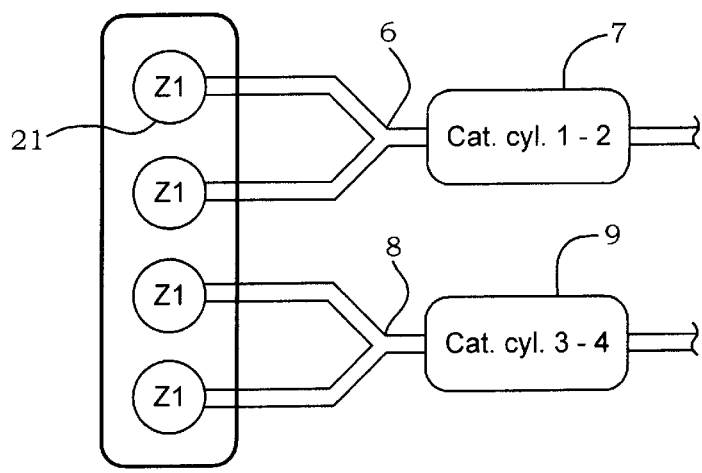
FIG. 3 shows a schematic block diagram of an internal combustion-engine system with a four-cylinder internal combustion engine and two parallel exhaust-gas catalytic converters, each serving two cylinders.

FIG. 1 shows schematically the sequence of a first example of the method for detecting flow-reducing changes in an exhaust-gas catalyst body of an exhaust-gas purification system during the operation of an associated internal combustion engine with at least one engine cylinder, the exhaust gas from which impinges upon the exhaust-gas catalyst body and to which is assigned an ion-current measuring probe 21 as seen in FIG. 3. In particular, this can be a conventional motor-vehicle internal combustion engine with an associated exhaust-gas purification system in which one or more exhaust-gas catalytic converters are provided, the procedure being illustrated by way of example in FIG. 1 with reference to one engine cylinder and one exhaust-gas catalytic converter connected to it.

A characteristic map K is determined and stored in advance, this map indicating a normal-intensity reference value for the ion-current signal as a function of the speed and load of the engine, as illustrated in the diagram at the bottom left in FIG. 1. With the engine running, the change in the resulting ion-current signal IS with respect to time is then determined for each operating cycle of the engine cylinder, starting from the ignition point (ZZP), by means of the ion-current measuring probe assigned to the said cylinder. The amplitude/time diagram at the top left in FIG. 1 shows a typical characteristic for the ion-current signal IS with two broad maxima and a minimum in-between.

In the subsequent evaluation of the ion-current signal IS measured, the value IG of the time integral of the ion-current signal IS measured is first of all calculated for the duration of the operating cycle. The amplitude/time diagram at the top right in FIG. 1 shows the resulting integral IG as the final value of the corresponding integral curve.

The measurement of the ion-current signal and its time integration is now repeated for the successive operating cycles during the operation of the engine. The integral IG obtained in each case, which in this example serves as a measure of the signal strength of the ion-current signal IS, is then subjected to averaging in an averaging step 1, preferably involving the formation of a sliding average over a specifiable number of the most recently determined integrals in each case. As an alternative, a suitable smoothing procedure can be provided. In either case, this step serves to identify or suppress one-off freak values or cycle fluctuations of the ion-current signal IS and hence also of the integral IG.

In a subsequent interrogation step 2, a check is made to determine whether the average ion-current integral determined in the previous step 1 is always less than a minimum strength determined as a product of a specifiable factor a and the normal-strength reference value obtained from the stored characteristic map K for the instantaneous engine operating point. It is self-evident that, for this purpose, the current engine operating state, i.e. in particular the instantaneous engine speed and the instantaneous engine load, is recorded in a conventional manner. The normal-strength reference value read out of the characteristic map K represents the value normally assumed on average by the time integral IG of the ion-current signal IS at the respective engine operating point, i.e. in trouble-free operation and, in particular, with a mechanically undamaged catalytic converter. The factor a is set to a suitable value less than one and thus determines the extent to which the specified minimum strength lies below the normal strength value dependent on the engine operating point.

If there is a flow-reducing change in the catalyst body leading to an increased exhaust-gas backpressure ahead of the catalytic converter and consequently in the upstream engine cylinder, leading there to an increased residual-gas rate and hence to a smaller ion-current signal, the average ion-current integral continuously falls below the minimum strength value.

As explained above, a flow-reducing change can result, in particular, from overheating of the catalytic converter. The catalytic converter can, for instance, be heated up to a temperature above its permissible maximum temperature due to spark failures, and it can lose not only its chemical properties but also undergo mechanical damage and, in extreme cases, may even burn out. In this process, its mechanical honeycomb structure disintegrates, resulting in the noticeable reduction mentioned in the gas flow rate.

If in interrogation step 2 the system ascertains that the average ion-current integral is not smaller than the said product of the factor a and the normal-strength reference value for the current engine operating point, it is possible to conclude with certainty that no significant reduction in the cross section of flow of the exhaust-gas catalyst body has occurred and the catalytic converter is therefore mechanically sound. If, on the other hand, the system ascertains that the average ion-current integral remains continuously below the said product of the factor a and the normal-strength reference value, corresponding warning information is generated to indicate that a flow-reducing change in the catalyst body, i.e. a mechanical defect in the catalytic converter, may have occurred.

If there is a plurality of exhaust-gas catalytic converters, the procedure illustrated in FIG. 1 can, of course, be employed for each of these catalytic converters. If a plurality of engine cylinders is connected on the exhaust side to a common exhaust-gas catalytic converter, a comparison between the ion-current signal strengths determined for the individual cylinders can be provided so that the warning information indicating the possible occurrence of a reduction in the cross section of flow of the catalytic converter is then only generated if the ion-current signal strength of all of these cylinders has fallen below the specified minimum strength value.

As an alternative in all cases to the use of the ion-current integral IG as shown in FIG. 1, the amplitude of the ion-current signal IS, in particular the peak-value amplitude of the first or second maximum of this signal, can be used as a measure of signal strength, in which case this amplitude value is averaged or smoothed in the same way and compared with a corresponding minimum amplitude value determined in a similar manner on the basis of a stored normal-amplitude characteristic map.

Figure 2:
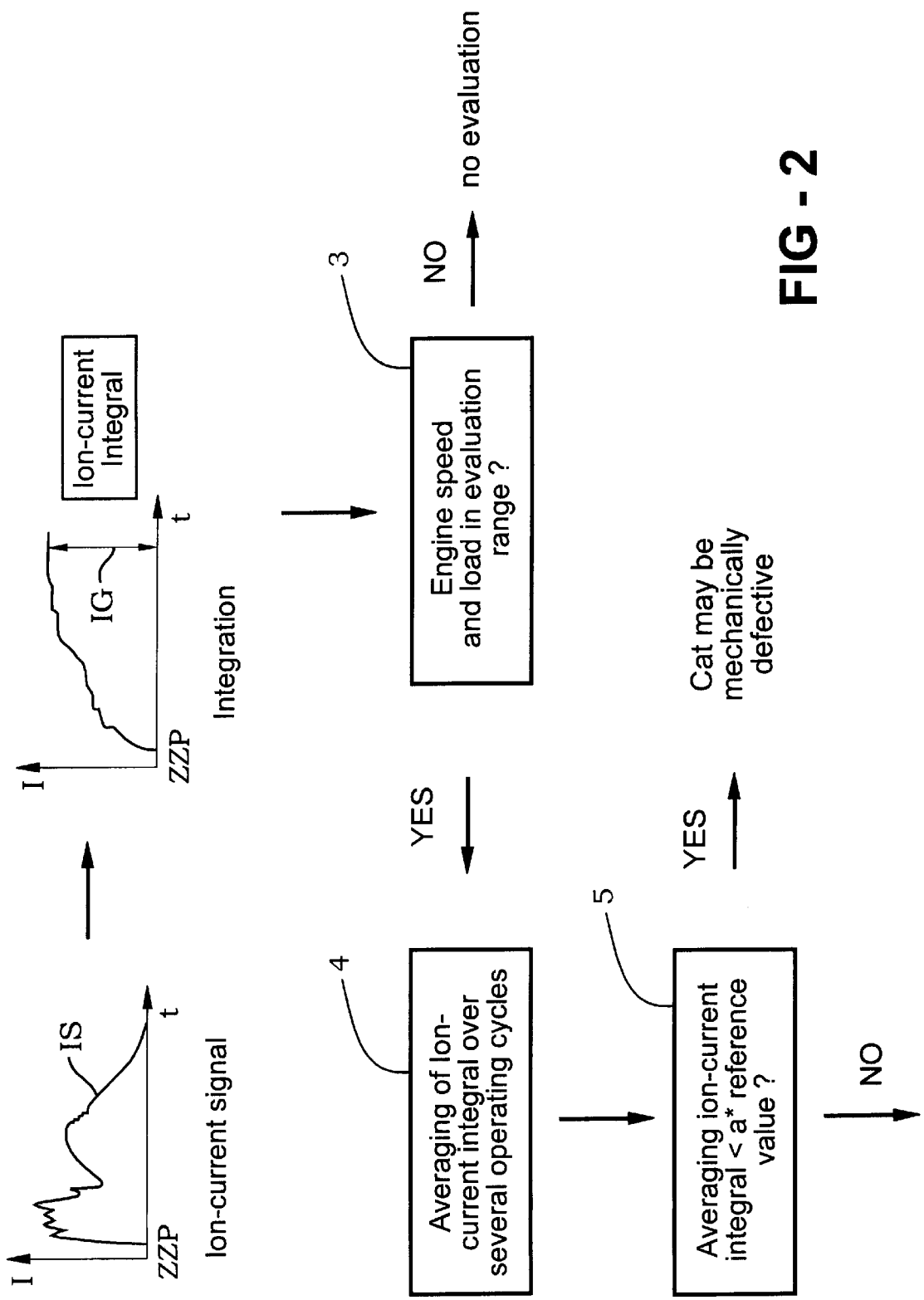
FIG. 2 shows a flowchart similar to that in FIG. 1 for a second example of the method, with evaluation only in a selected desired engine operating state for evaluation.

FIG. 2 shows an example of the method which has been modified in comparison with FIG. 1 such that it is not necessary to store a reference-value characteristic map in advance. Instead, the evaluation of the ion-current signal is, in this example, limited to a part of the overall engine operating range as an evaluation range, preferably being limited to a single point or a narrow range surrounding a point in the engine-speed and -load map. For this single engine operating point or range surrounding this engine operating point, it is sufficient to specify a single normal-strength reference value applicable to it.

During the operation of the engine, the ion current IS is then once again measured over an operating cycle, as in the example shown in FIG. 1, and the associated ion-current integral IG is calculated. In an interrogation step 3, the system then ascertains whether the instantaneous engine operating point, represented by the instantaneous speed and instantaneous load of the engine is within the evaluation range, i.e. corresponds to the specified engine operating point for evaluation or is in the specified range surrounding the engine operating point. If this is not the case, this ion-current integral is not evaluated but discarded. If, on the other hand, the actual engine operating state corresponds to the desired engine operating state for evaluation, the calculated integral IG applies for further evaluation, this consisting once again, as in FIG. 1, of an averaging step 4 or, alternatively, a smoothing step, applied to the ion-current integrals IG, determined thus far for the specified desired engine operating state, for a plurality of operating cycles, and of a subsequent interrogation step 5 to determine whether the averaged ion-current integral thus determined remains continuously below the product of the factor a and the single normal-strength reference value specified here. If this is not the case, it is then possible, once again, to conclude with certainty that there is no mechanical defect in the catalytic converter. If, on the other hand, it is the case, the corresponding warning information is generated to indicate that the catalytic converter may be mechanically defective and may have undergone a significant reduction in its cross section of flow.

In other respects, the same properties, advantages and possible modifications apply to the example of the method shown in FIG. 2 as explained above with reference to FIG. 1. In either case, provision is preferably made for the engine to be stopped automatically when the said warning information is generated in order to prevent any damage to the engine, or at least for injection to be interrupted to those cylinders which are connected to the possibly damaged catalytic converter in order to avoid further damage to the latter.

Figure 4:
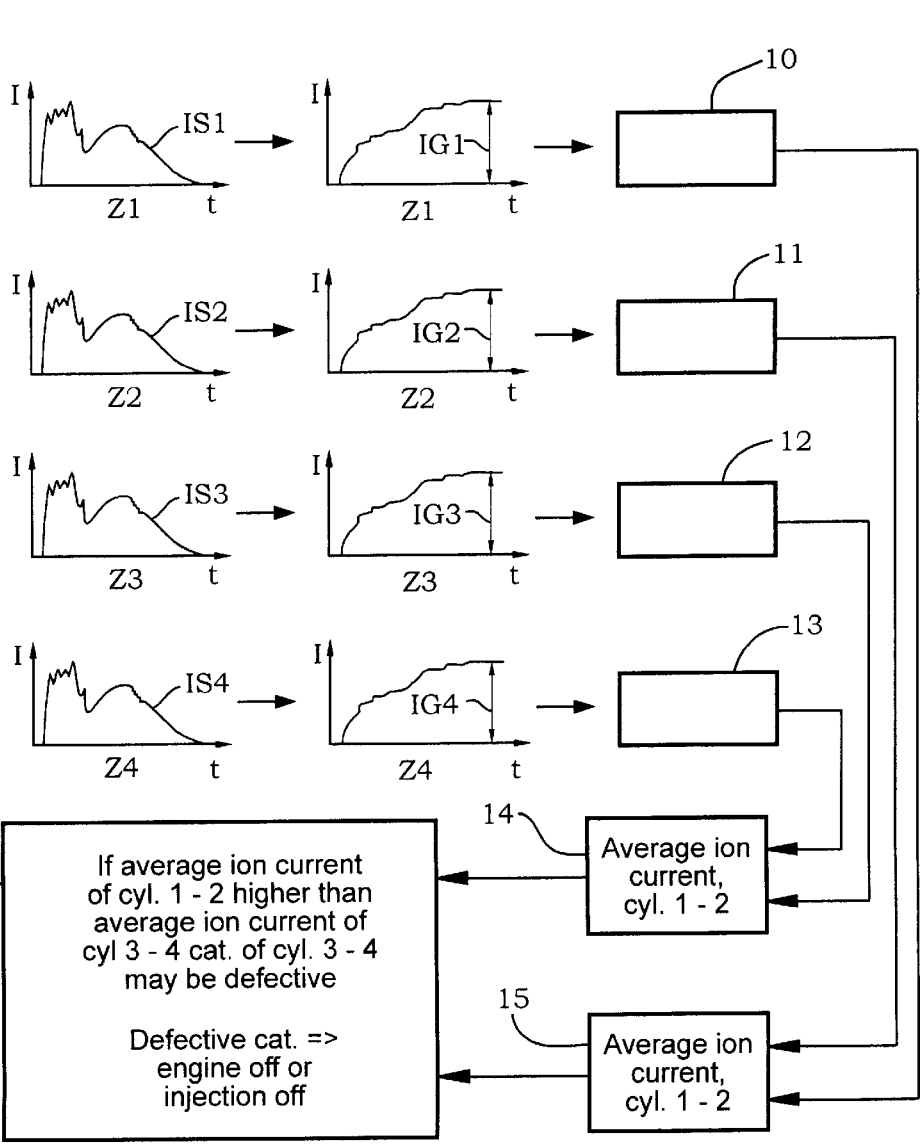
FIG. 4 shows a flowchart of a third example of the method for detecting flow-reducing changes in one or the other of the two exhaust-gas catalytic converters in FIG. 3.

FIGS. 3 and 4 illustrate another example of the method, this example specifically allowing detection of a reduction in the cross section of flow, due for example to mechanical damage, for each of a plurality of parallel exhaust-gas catalytic converters, it being unnecessary to specify a fixed normal-strength reference value for the ion-current signal, it being possible instead for this reference to be formed from the ion-current signal of the engine cylinders associated with the other catalytic converter or converters. By way of example, FIG. 3 considers the case of an internal combustion engine with four cylinders Z1, Z2, Z3, Z4, of which a first and second cylinder Z1, Z2 are jointly connected, by a first exhaust-line branch 6, to a first exhaust-gas catalytic converter 7, and a third and fourth cylinder Z3, Z4 are connected, by a second exhaust-line branch 8 parallel to the first, to a second exhaust-gas catalytic converter 9 parallel to the first. The two catalytic converters 7, 9 can, for example, be front catalytic converters close to the engine, which are arranged very close to the cylinder exhaust valves in order to attain their operating temperature as quickly as possible.

The basic idea consists in comparing the strengths of the ion-current signals of the various cylinders where there is a plurality of parallel catalytic converters as described above. If there is a change, more specifically a reduction, in the ion-current signal strength for all the cylinders connected to one of the catalytic converters relative to the ion-current signal strengths of the other engine cylinders, it is possible to conclude with a high degree of probability that the catalytic converter concerned is mechanically defective and therefore has a reduced cross section of flow. If there is only one exhaust-gas catalytic converter, an increase in the ion-current signal for all the engine cylinders could also be due to the effects of fuel, and this would have to be clarified further if appropriate. In the case shown here in FIGS. 3 and 4, however, this effect is automatically screened out by comparing the ion-current signal strengths of the individual cylinders connected to respective common exhaust lines 6 and 8.

In accordance with this basic idea and as illustrated in FIG. 4, the ion-current signal IS1, IS2, IS3, IS4 associated with each of the four cylinders Z1 to Z4 is measured separately over the respective operating cycle and, from this, the ion-current integral IG1, IG2, IG3, IG4 associated with each cylinder Z1 to Z4 is calculated separately. In parallel averaging or smoothing steps 10, 11, 12, 13, an averaged or smoothed ion-current integral is determined for each individual cylinder from the integrals IG1 to IG4 calculated previously for the cylinders Z1 to Z4 concerned, e.g. by the formation of a sliding average over a plurality of preceding operating cycles of the cylinder Z1 to Z4 concerned. In two parallel averaging steps 14, 15, the average of the two averaged or smoothed ion-current integrals determined for the first and second cylinder Z1, Z2, on the one hand, and the average of the two averaged or smoothed ion-current integrals for the third and fourth cylinder Z3, Z4, on the other hand, are then formed.

In a subsequent evaluation step 16, the system then ascertains whether the two averages of the ion-current integrals differ by more than a certain amount, for which purpose a corresponding difference limit value can be specified as a function of the engine operating point. If this is not the case, it can be assumed with a high degree of probability that both catalytic converters 7, 9 are mechanically sound since it is unlikely that both will become mechanically defective to the same degree simultaneously. If, on the other hand, it is found that one average is appreciably larger than the other, this is taken as an indication that the catalytic converter connected to the engine cylinders associated with the smaller average may have undergone flow-reducing damage.

If, for example, as indicated in step 16 of FIG. 4, the average of the ion-current integrals associated with the first two cylinders Z1, Z2 is larger than that associated with the third and fourth cylinders Z3, Z4, this is an indication that there is flow-reducing damage to the catalytic converter 9 associated with the third and fourth cylinders Z3, Z4, this then being indicated by correspondingly generated warning information. This warning information can be used to automatically switch off the engine or at least the injection and hence deactivate active operation of the third and the fourth cylinder Z3, Z4.

In the example shown in FIGS. 3 and 4, it is possible to provide a comparison between the ion-current signals or signal strengths determined from them in the form of the integral or a peak-value amplitude of respective groups of cylinders connected to a common catalytic converter in order to eliminate the effects of, for example, the quality of the fuel, i.e. the ion-current signals of the two first cylinders Z1, Z2 and/or of the third and the fourth cylinder Z3, Z4 can be compared. In other respects, the advantages and possible variations mentioned with reference to FIG. 1 can also be obtained in a similar manner with the example of the method illustrated in FIGS. 3 and 4.

As the above description of advantageous illustrative embodiments shows, the method according to the invention allows relatively simple and reliable detection of mechanical catalytic-converter effects whilst the engine is running and hence timely prevention of corresponding engine damage. Timely detection of such catalytic-converter defects furthermore prevents excessive exhaust emissions which can be caused by such defective catalytic converters.

The foregoing description constitutes the preferred embodiments devised by the inventors for practicing the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A method for detecting flow-reducing changes in an exhaust-gas catalyst body of an exhaust-gas purification system during the operation of an associated internal combustion engine with at least one engine cylinder, said at least one engine cylinder having a plurality of operating conditions that produces exhaust gas that impinges upon the exhaust-gas catalyst body, said at least one engine cylinder includes an ion-current measuring probe associated therewith that produces an ion-current signal, said method comprising:

identifying a minimum strength desired for said ion-current signal;

monitoring said strength of said ion-current signal produced by said ion-current measuring probe associated with said at least one engine cylinder;

comparing said strength of said ion-current signal to said minimum strength of said ion-current signal; and providing a warning indicating a flow-reducing change in said catalyst body when said strength of said ion-current falls below said minimum strength.

2. The method as set forth in claim 1, wherein said minimum strength is specified for a plurality of operating conditions of said at least one engine cylinder as a function of the load and speed of said internal combustion engine, and wherein said strength of said ion current signal is determined during one particular condition of said plurality of operating conditions of said at least one engine cylinder and compared to the minimum strength associated with said one particular condition.

3. A method for detecting flow-reducing changes in an exhaust-gas catalyst body of an exhaust-gas purification system during the operation of an associated internal combustion engine with at least one engine cylinder, said at least one engine cylinder having a plurality of operating conditions that produces exhaust gas that impinges upon the exhaust-gas catalyst body, said at least one engine cylinder includes an ion-current measuring probe associated therewith that produces an ion-current signal, said method comprising:

identifying a minimum integration value desired for said ion-current signal;

monitoring said strength of said ion-current signal produced by said ion-current measuring probe associated with said at least one engine cylinder over an operating cycle of said at least one engine cylinder;

integrating said ion-current signal over said operating cycle of said at least one engine cylinder to produce an integrated value; and comparing said integrated value to said minimum integration value; and providing a warning indicating a flow-reducing change in said catalyst body when said integrated value falls below said minimum integration value for at least one operating cycle.

4. The method as set forth in claim 3, wherein said minimum integration value is specified for a plurality of operating conditions of said at least one engine cylinder as a function of the load and speed of said internal combustion engine, and wherein said integrated value is determined during one particular condition of said plurality of operating conditions of said at least one engine cylinder and compared to said integrated value associated with said one particular condition.

5. The method as set forth in claim 3, wherein the step of providing a warning indicating a flow-reducing change in said catalyst body occurs only when said integrated value falls below said minimum integration value for several consecutive operating cycles.

6. A method for detecting flow-reducing changes in an exhaust-gas catalyst body of an exhaust-gas purification system during the operation of an associated internal combustion engine with at least one engine cylinder, said at least one engine cylinder having a plurality of operating conditions that produces exhaust gas that impinges upon the exhaust-gas catalyst body, said at least one engine cylinder includes an ion-current measuring probe associated therewith that produces an ion-current signal, said method comprising:

identifying a evaluation range of a operating cycle of said at least one engine cylinder;

identifying a minimum strength desired for said ion-current signal during said evaluation range;

monitoring said strength of said ion-current signal produced by said ion-current measuring probe associated with said at least one engine cylinder;

comparing said strength of said ion-current signal during said evaluation range to said minimum strength of said ion-current signal; and providing a warning indicating a flow-reducing change in said catalyst body when said strength of said ion-current falls below said minimum strength.

7. The method as set forth in claim 6, wherein said minimum strength during said evaluation range is specified for a plurality of operating conditions of said at least one engine cylinder as a function of the load and speed of said internal combustion engine, and wherein said strength of said ion-current is determined during one particular condition of said plurality of operating conditions of said at least one engine cylinder and compared to said minimum strength associated with said one particular condition.

8. The method as set forth in claim 6, wherein the step of providing a warning indicating a flow-reducing change in said catalyst body occurs only when said integrated value falls below said minimum integration value for several consecutive operating cycles.

9. A method for detecting flow-reducing changes in an exhaust-gas catalyst body of an exhaust-gas purification system during the operation of an associated internal combustion engine with at least one engine cylinder, said at least one engine cylinder having a plurality of operating conditions that produces exhaust gas that impinges upon the exhaust-gas catalyst body, said at least one engine cylinder includes an ion-current measuring probe associated therewith that produces an ion-current signal, said method comprising:

identifying a minimum peak-value amplitude value desired for said ion-current signal;

monitoring said strength of said ion-current signal produced by said ion-current measuring probe associated with said at least one engine cylinder over an operating cycle of said at least one engine cylinder;

identifying a peak-value amplitude of said ion-current signal over said operating cycle of said at least one engine cylinder; and comparing said peak-value amplitude to said minimum peak-value amplitude; and providing a warning indicating a flow-reducing change in said catalyst body when said peak-value amplitude falls below said minimum peak value amplitude for at least one operating cycle.

10. The method as set forth in claim 9, wherein said minimum peak-value amplitude is specified for a plurality of operating conditions of said at least one engine cylinder as a function of the load and speed of said internal combustion engine, and wherein said peak-value amplitude is determined during one particular condition of said plurality of operating conditions of said at least one engine cylinder and compared to said peak-value amplitude associated with said one particular condition.

11. The method as set forth in claim 9, wherein the step of providing a warning indicating a flow-reducing change in said catalyst body occurs only when said peak-value amplitude falls below said minimum peak-value amplitude for several consecutive operating cycles.

12. A method for detecting flow-reducing changes in an exhaust-gas catalyst body of an exhaust-gas purification system during the operation of an associated internal combustion engine having at least one engine cylinder associated with a first exhaust-gas catalyst body and at least one engine cylinder associated, each of said engine cylinders having a plurality of operating conditions that produces exhaust gas that impinges upon its associated exhaust-gas catalyst body, said at least one engine cylinder associated with said first exhaust-gas catalyst body includes an ion-current measuring probe associated therewith that produces an ion-current signal, said at least one engine cylinder associated with said second exhaust-gas catalyst body includes an ion-current measuring probe associated therewith that produces an ion-current signal said method comprising:

monitoring said strength of said ion-current signal produced by said ion-current measuring probe associated with a first exhaust-gas catalyst body;

monitoring said strength of said ion-current signal produced by said ion-current measuring probe associated with a second exhaust-gas catalyst body; and providing a warning indicating a flow-reducing change in one of said catalyst bodies when said strength of said ion-current associated with said first exhaust-gas catalyst body and said strength of said ion-current associated with said second exhaust-gas catalyst body differ by more than a predetermined amount.

13. A method as set forth in claim 12, further comprising the steps of:

averaging the strength of said ion-current signal produced by said ion-current measuring probes associated with said first exhaust-gas catalyst body producing a first averaged strength; and averaging the strength of said ion-current signal produced by said ion-current measuring probes associated with said second exhaust-gas catalyst body producing a second average strength; and providing a warning indicating a flow-reducing change in one of said catalyst bodies when said first average strength and said second average strength differ by more than a predetermined amount.

* * * * *